(12) United States Patent
Liu

(10) Patent No.: US 11,438,903 B2
(45) Date of Patent: Sep. 6, 2022

(54) COMMUNICATIONS METHOD AND APPARATUS

(71) Applicant: Huawei Technologies Co., Ltd., Shenzhen (CN)

(72) Inventor: Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 16/832,330

(22) Filed: Mar. 27, 2020

(65) Prior Publication Data

US 2020/0314864 A1 Oct. 1, 2020

(30) Foreign Application Priority Data

Mar. 29, 2019 (CN) .......................... 201910249468.7

(51) Int. Cl.
*H04W 72/08* (2009.01)
*H04L 5/00* (2006.01)
*H04W 72/04* (2009.01)
*H04W 4/50* (2018.01)
*H04W 84/04* (2009.01)

(52) U.S. Cl.
CPC .......... *H04W 72/082* (2013.01); *H04L 5/0053* (2013.01); *H04W 72/042* (2013.01); *H04W 72/0446* (2013.01); *H04W 84/047* (2013.01)

(58) Field of Classification Search
CPC . H04W 72/082; H04W 84/047; H04W 76/10; H04W 4/50; H04W 72/0453
See application file for complete search history.

(56) References Cited

U.S. PATENT DOCUMENTS

| | | | | |
|---|---|---|---|---|
| 2011/0292865 A1* | 12/2011 | Seo | .................. | H04W 16/26 375/211 |
| 2013/0072201 A1* | 3/2013 | Nakamura | ............ | H04W 16/08 455/445 |
| 2013/0230014 A1* | 9/2013 | Kitaji | .................... | H04W 28/08 370/329 |
| 2014/0169490 A1* | 6/2014 | Medbo | ................ | H04W 52/346 375/267 |
| 2014/0301370 A1* | 10/2014 | Sivavakeesar | ........... | H04B 7/15 370/331 |

(Continued)

FOREIGN PATENT DOCUMENTS

| | | |
|---|---|---|
| CN | 106506424 A | 3/2017 |
| WO | 2013139231 A1 | 9/2013 |
| WO | 2017027520 A1 | 2/2017 |

*Primary Examiner* — Diane L Lo
*Assistant Examiner* — Abusayeed M Haque
(74) *Attorney, Agent, or Firm* — Conley Rose, P.C.

(57) ABSTRACT

A communications method is applied to a communications system including a backhaul node and a first wireless access device. The first wireless access device receives a first backhaul signal by using a first radio resource, and receives a first service signal by using a second radio resource. Herein, the first backhaul signal includes backhaul data sent by the backhaul node to the first wireless access device, the first service signal includes service data sent by a terminal to the first wireless access device, and the first radio resource is partially or completely the same as the second radio resource. Therefore, the first wireless access device may transmit the backhaul data and the service data on a radio resource.

24 Claims, 7 Drawing Sheets

(56) References Cited

U.S. PATENT DOCUMENTS

| | | | |
|---|---|---|---|
| 2015/0029989 A1* | 1/2015 | Shiizaki | H04W 72/042 |
| | | | 370/329 |
| 2016/0100415 A1 | 4/2016 | Mishra et al. | |
| 2016/0212755 A1* | 7/2016 | Cao | H04L 45/245 |
| 2017/0064731 A1 | 3/2017 | Wang et al. | |
| 2017/0135147 A1* | 5/2017 | Belghoul | H04W 72/085 |
| 2018/0049190 A1 | 2/2018 | Abedini et al. | |
| 2018/0076839 A1 | 3/2018 | Baghel et al. | |
| 2019/0014375 A1* | 1/2019 | Liu | H04L 65/612 |
| 2019/0014500 A1 | 1/2019 | Abedini et al. | |

* cited by examiner

←——→ Wireless access link
←——→ Wireless backhaul link

COMMUNICATIONS METHOD AND APPARATUS

CROSS-REFERENCE TO RELATED APPLICATIONS

This claims priority to Chinese Patent App. No. 201910249468.7 filed on Mar. 29, 2019, which is incorporated by reference.

TECHNICAL FIELD

This disclosure relates to the field of communications technologies, and in particular, to a communications method and apparatus.

BACKGROUND

When a base station is connected to a network through wireless backhaul, the base station needs to use radio resources to transmit both service data (data transmitted between the base station and a terminal) and backhaul data (data transmitted between the base station and a core network).

Usually, the base station transmits the service data and the backhaul data in an in-band time division multiplexing and/or frequency division multiplexing manner. In this way, the base station needs to occupy some radio resources (a time resource and/or a frequency resource) dedicated for transmitting the backhaul data. Consequently, a waste of radio resources is caused and radio resource utilization is reduced.

SUMMARY

This disclosure provides a communications method and apparatus, to resolve a problem of low radio resource utilization.

To achieve the foregoing objective, the following technical solutions are used in the embodiments.

According to a first aspect, a communications method is provided, and the communications method is applied to a communications system including a backhaul node and a first wireless access device. Specifically, the first wireless access device receives a first backhaul signal by using a first radio resource, and receives a first service signal by using a second radio resource. Herein, the first backhaul signal includes backhaul data sent by the backhaul node to the first wireless access device, and the first service signal includes service data sent by a terminal to the first wireless access device. The first radio resource is partially or completely the same as the second radio resource. In this way, the first wireless access device can transmit the backhaul data and the service data on a radio resource. Compared with other approaches, the disclosed communications method effectively improves radio resource utilization.

In a possible implementation, the first wireless access device includes a wireless access function entity communicating with the terminal and a wireless backhaul function entity communicating with the backhaul node. With reference to the foregoing description, the wireless backhaul function entity may receive the first backhaul signal by using the first radio resource, and the wireless access function entity receives the first service signal by using the second radio resource. Subsequently, the wireless access function entity interacts with the wireless backhaul function entity, to implement interference cancellation on the first service signal. After receiving the first backhaul signal, the wireless backhaul function entity parses the first backhaul signal to obtain a first estimation signal, and the first estimation signal is an estimation of a second backhaul signal (the second backhaul signal is sent by the backhaul node to the first wireless access device). Subsequently, the wireless access function entity obtains an estimation of a backhaul interference channel (the backhaul interference channel is a channel between the backhaul node and the wireless access function entity), obtains the first estimation signal from the wireless backhaul function entity, and further determines an interference estimation signal based on the estimation of the backhaul interference channel and the first estimation signal. In this way, the wireless access function entity can determine, based on the interference estimation signal and the received first service signal, an interference-cancelled first service signal. Subsequently, the wireless access function entity parses the interference-cancelled first service signal to obtain the service data.

The wireless backhaul function entity interacts with the wireless access function entity, to implement interference cancellation on a service signal, and improve accuracy of determining the service data.

In another possible implementation, a method for obtaining the estimation of the backhaul interference channel by the wireless access function entity is as follows: The wireless access function entity sends, to the terminal, a scheduling message used to instruct the terminal to suspend sending service data at a preset time. In this way, the wireless backhaul function entity can receive a first signal at the preset time, and the wireless access function entity receives a second signal at the preset time. Subsequently, the wireless backhaul function entity parses the first signal to obtain a second estimation signal, and the second estimation signal is an estimation of a third backhaul signal (the third backhaul signal is sent by the backhaul node to the first wireless access device at the preset time). After the wireless backhaul function entity obtains the second estimation signal, the wireless access function entity obtains the second estimation signal from the wireless backhaul function entity, and determines the estimation of the backhaul interference channel based on the second signal and the second estimation signal.

When the terminal suspends sending the service data at the preset time, the wireless access function entity cannot receive the service data. In this case, the wireless access function entity and the wireless backhaul function entity may accurately determine the estimation of the backhaul interference channel based on the respective signals received by the wireless access function entity and the wireless backhaul function entity.

In another possible implementation, the communications system further includes a second wireless access device. The first wireless access device may further send first switched data to the second wireless access device by using the backhaul node. The first switched data includes at least one of status information of a radio resource of the first wireless access device, status information of a user channel of the first wireless access device, and service data to be jointly sent. Alternatively, the first wireless access device receives second switched data from the second wireless access device by using the backhaul node. The second switched data includes at least one of status information of a radio resource of the second wireless access device, status information of a user channel of the second wireless access device, and service data to be jointly sent.

In addition to the backhaul data, the backhaul node may be further configured to transmit switched data between different wireless access devices.

In another possible implementation, the first wireless access device may further send the backhaul data to the backhaul node by using the first radio resource, and send the service data to the terminal by using the second radio resource.

The communications method provided is applicable to sending downlink data/downlink signaling from a wireless access device to a terminal and sending backhaul data by a backhaul node to a wireless access device; or is applicable to sending uplink data/uplink signaling from a terminal to a wireless access device and sending backhaul data by a wireless access device to a backhaul node.

According to a second aspect, a communications apparatus is provided. The communications apparatus can implement functions of any one of the first aspect and the possible implementations of the first aspect. The functions may be implemented by hardware, or may be implemented by hardware executing corresponding software. The hardware or software includes one or more modules corresponding to the foregoing functions.

In a possible manner, the communications apparatus may include a wireless backhaul function entity and a wireless access function entity. The wireless backhaul function entity and the wireless access function entity may perform corresponding functions in the communications method according to any one of the first aspect and the possible implementations of the first aspect. For example, the wireless backhaul function entity is configured to receive a first backhaul signal by using a first radio resource, where the first backhaul signal includes backhaul data sent by a backhaul node to the communications apparatus. The wireless access function entity is configured to receive a first service signal by using a second radio resource, where the first service signal includes service data sent by a terminal to the communications apparatus, and the first radio resource is partially or completely the same as the second radio resource.

According to a third aspect, a communications apparatus is provided. The communications apparatus includes a processor, a communications interface, and an antenna. Under control of the processor, the communications interface communicates with another device by using the antenna, so that the communications apparatus performs the communications method according to any one of the first aspect and the possible implementations of the first aspect.

Optionally, the communications apparatus further includes a memory, and the memory is connected to the processor. The memory is configured to store a computer instruction, and when the processor executes the computer instruction, the communications interface is controlled to communicate with another device by using the antenna, so that the communications apparatus performs the communications method according to any one of the first aspect and the possible implementations of the first aspect.

The communications apparatus may be a first wireless access device.

According to a fourth aspect, a computer readable storage medium is further provided, and the computer readable storage medium stores a computer instruction. When the computer instruction is run on a communications apparatus, the communications apparatus is enabled to perform the communications method according to the first aspect and the possible implementations of the first aspect.

According to a fifth aspect, a computer program product is further provided, and the computer program product includes a computer instruction. When the computer instruction is run on a communications apparatus, the communications apparatus is enabled to perform the communications method according to the first aspect and the possible implementations of the first aspect.

It should be noted that all or some of the foregoing computer instructions may be stored in a first computer storage medium. The first computer storage medium may be integrated with a processor of the communications apparatus, or may be deployed independently of a processor of the communications apparatus.

According to a sixth aspect, a wireless chip system is provided. The wireless chip system includes a processor and a memory, and the memory stores a computer instruction. When the computer instruction is executed by the processor, the communications method according to any one of the first aspect and the possible implementations of the first aspect is implemented.

The wireless chip system is a chip system in a wireless access network device. Optionally, the wireless chip system includes a chip, or may include another discrete device or circuit structure.

For descriptions of the second aspect, the third aspect, the fourth aspect, the fifth aspect, the sixth aspect, and the various implementations thereof, refer to the detailed descriptions of the first aspect and the various implementations of the first aspect. For beneficial effects of the second aspect, the third aspect, the fourth aspect, the fifth aspect, the sixth aspect, and the various implementations thereof, refer to the analyses of the beneficial effects of the first aspect and the various implementations of the first aspect. Details are not described herein again.

According to a seventh aspect, a communications method is provided, and the communications method is applied to a communications system including a backhaul node and a first wireless access device. For the backhaul node, the backhaul node transmits backhaul data to the first wireless access device by using a first radio resource. The first radio resource is further used to transmit service data between the first wireless access device and a terminal, and the first radio resource includes at least one of a time domain resource and a frequency domain resource that are used for wireless transmission.

The first radio resource is used to transmit the backhaul data, and is further used to transmit the service data. Compared with other approaches, the communications method provided effectively improves radio resource utilization.

In a possible implementation, the communications system further includes a second wireless access device. In this scenario, the backhaul node may further receive switched data of the first wireless access device, and send the switched data of the first wireless access device to the second wireless access device. The switched data of the first wireless access device herein includes at least one of status information of a radio resource of the first wireless access device, status information of a user channel of the first wireless access device, and service data to be jointly sent. Alternatively, the backhaul node may receive switched data of the second wireless access device, and send the switched data of the second wireless access device to the first wireless access device. The switched data of the second wireless access device includes at least one of status information of a radio resource of the second wireless access device, status information of a user channel of the second wireless access device, and service data to be jointly sent.

The backhaul node transmits the backhaul data, and may further serve as a switching node between different wireless access devices, and is configured to transmit switched data between a plurality of wireless access devices. For a wireless access device, switched data of the wireless access device includes at least one of status information of a radio resource of the wireless access device, status information of a user channel of the wireless access device, and service data to be jointly sent.

According to an eighth aspect, a communications apparatus is provided. The communications apparatus can implement functions of any one of the seventh aspect and the possible implementations of the seventh aspect. The functions may be implemented by hardware, or may be implemented by hardware executing corresponding software. The hardware or software includes one or more modules corresponding to the foregoing functions.

In a possible manner, the communications apparatus may include a transmission unit and a processing unit. The transmission unit and the processing unit may perform corresponding functions in the communications method according to any one of the seventh aspect and the possible implementations of the seventh aspect. For example, the transmission unit is configured to transmit backhaul data to a first wireless access device by using a first radio resource determined by the processing unit. The first radio resource is further used to transmit service data between the first wireless access device and a terminal, and the first radio resource includes at least one of a time domain resource and a frequency domain resource that are used for wireless transmission.

According to a ninth aspect, a communications apparatus is provided. The communications apparatus includes a processor, a communications interface, and an antenna. Under control of the processor, the communications interface communicates with another device by using the antenna, so that the communications apparatus performs the communications method according to any one of the seventh aspect and the possible implementations of the seventh aspect.

Optionally, the communications apparatus further includes a memory, and the memory is connected to the processor. The memory is configured to store a computer instruction, and when the processor executes the computer instruction, the communications interface is controlled to communicate with another device by using the antenna, so that the communications apparatus performs the communications method according to any one of the seventh aspect and the possible implementations of the seventh aspect.

The communications apparatus may be a backhaul node.

According to a tenth aspect, a computer readable storage medium is further provided, and the computer readable storage medium stores a computer instruction. When the computer instruction is run on a communications apparatus, the communications apparatus is enabled to perform the communications method according to the seventh aspect and the possible implementations of the seventh aspect.

According to an eleventh aspect, a computer program product is further provided, and the computer program product includes a computer instruction. When the computer instruction is run on a communications apparatus, the communications apparatus is enabled to perform the communications method according to the seventh aspect and the possible implementations of the seventh aspect.

It should be noted that all or some of the foregoing computer instructions may be stored in a first computer storage medium. The first computer storage medium may be integrated with a processor of the communications apparatus, or may be deployed independently of a processor of the communications apparatus.

According to a twelfth aspect, a wireless chip system is further provided. The wireless chip system includes a processor and a memory, and the memory stores a computer instruction. When the computer instruction is executed by the processor, the communications method according to any one of the seventh aspect and the possible implementations of the seventh aspect is implemented.

The wireless chip system is a chip system in a backhaul node. Optionally, the wireless chip system includes a chip, or may include another discrete device or circuit structure.

For descriptions of the eighth aspect, the ninth aspect, the tenth aspect, the eleventh aspect, the twelfth aspect, and the various implementations thereof, refer to the detailed descriptions of the seventh aspect and the various implementations of the seventh aspect. For beneficial effects of the eighth aspect, the ninth aspect, the tenth aspect, the eleventh aspect, the twelfth aspect, and the various implementations thereof, refer to the analyses of the beneficial effects of the seventh aspect and the various implementations of the seventh aspect. Details are not described herein again.

According to a thirteenth aspect, a communications system is provided. The communications system includes the communications apparatus according to any one of the second aspect to the fifth aspect, a terminal, and the communications apparatus according to any one of the eighth aspect to the eleventh aspect.

Names of the foregoing communications apparatuses do not constitute any limitation to devices or function modules. During actual implementation, these devices or function modules may have other names. Each device or function module falls within the scope defined by the claims and their equivalent technologies, provided that a function of the device or function module is similar to that described in this disclosure.

These aspects or another aspect is more concise and comprehensible in the following description.

DESCRIPTION OF EMBODIMENTS

Figure 1:
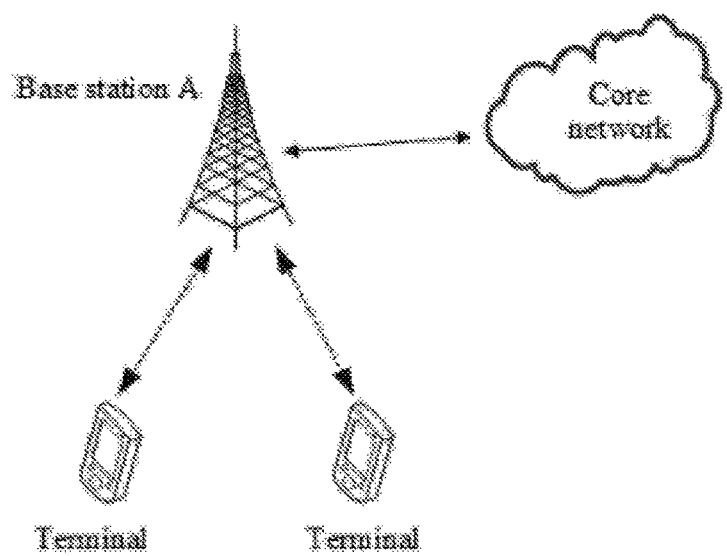
FIG. 1A and FIG. 1B are schematic structural diagrams of a common wireless backhaul communications system.
Figure 1:
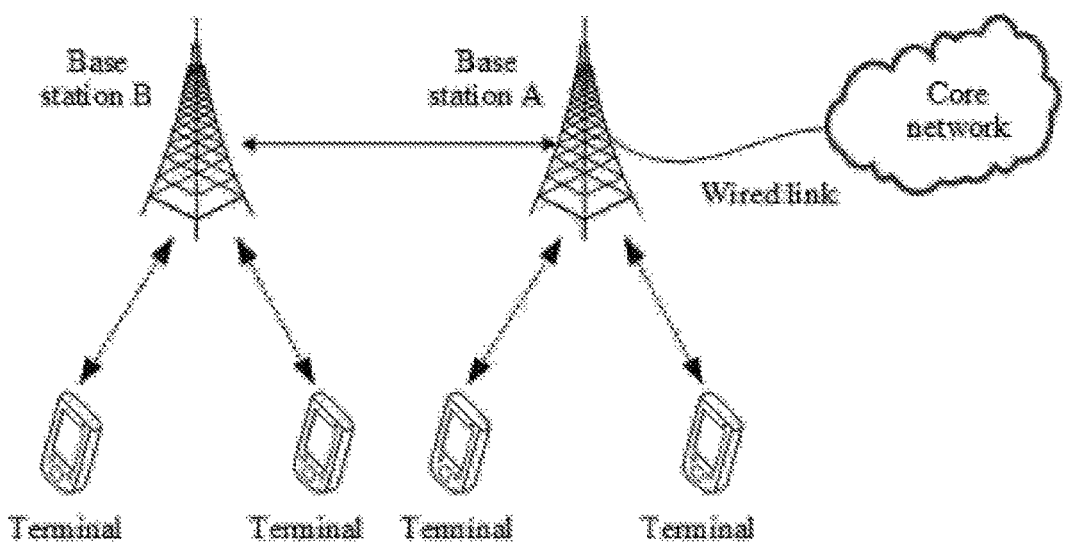

The word "example" or the phrase "for example" is used to represent giving an example, an illustration, or a description. Any embodiment or design scheme described as "example" or "for example" in the embodiments should not be explained as being more preferred or having more advantages than another embodiment or design scheme. Exactly, use of the word "example" or "for example" or the like is intended to present a relative concept in a specific manner.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the description of the embodiments, unless otherwise stated, "a plurality of" means two or more than two.

It should be understood that names of all nodes and messages are merely names for ease of description, and names in an actual network may be different. It should not be understood that names of various nodes and messages are limited. On the contrary, any name that has a same or similar function as a node or a message is considered as a method of this disclosure or equivalent replacement of this disclosure, and falls within the protection scope of this disclosure, and details are not described below.

With rapid development of mobile network services, more base stations need to be deployed to improve network capacity. In actual application, a problem in data backhaul needs to be resolved during base station deployment, that is, data interworking between a base station and a core network needs to be implemented.

In a conventional data backhaul mode, optical fibers are directly deployed between the base station and the core network to provide high-speed, stable, and highly reliable transmission. However, a transmission manner of straight-through optical fibers is high-cost in deployment and time-consuming in construction. In addition, as base stations are deployed densely, not all sites have a condition for deploying the straight-through optical fiber. To improve deployment flexibility and resolve a deployment problem caused when there is no wired backhaul link, wireless backhaul technologies are used.

The wireless backhaul technology enables data exchange between the base station and the core network through wireless backhaul links. The wireless backhaul link is a wireless link used when the base station communicates with a core network device.

Generally, the wireless backhaul technologies include microwave transmission and wireless backhaul technologies other than the microwave transmission. This disclosure is mainly described by using a wireless backhaul technology other than the microwave transmission. All wireless backhaul technologies described below are wireless backhaul technologies other than the microwave transmission.

A wireless backhaul communications system usually includes at least one base station, and each base station serves a plurality of terminals. A base station (for example, a base station A) in the at least one base station is connected to the core network in a wired/wireless manner, and other base stations are connected to the core network by using the base station A.

For example, FIG. 1A and FIG. 1B show structures of a common wireless backhaul communications system. As shown in FIG. 1A, a wireless backhaul communications system includes a base station A. The base station A serves a plurality of terminals, and the base station A is connected to a core network by using a wireless backhaul link. As shown in FIG. 1B, a base station A is connected to a core network by using a wired link (for example, an optical fiber), and is connected to a base station B by using a wireless backhaul link. The base station A and the base station B each serves a plurality of terminals.

In FIG. 1B, when the base station B needs to transmit uplink data (including uplink user plane data and uplink control plane signaling) of a terminal to the core network, the base station B sends the uplink data to the base station A by using the wireless backhaul link, and then the base station A sends the uplink data to a core network device by using the wired link. Correspondingly, when the core network needs to transmit downlink data (including downlink user plane data and downlink control plane signaling) to a terminal, the core network device first transmits the downlink data to the base station A, and then the base station A sends the downlink data to the base station B by using the wireless backhaul link. Further, the base station B sends the downlink data to the terminal.

For ease of description, a wireless link used for communication between a terminal and a base station is referred to as a wireless access link, a wireless link used for communication between a base station and a core network device is referred to as a wireless backhaul link, data transmitted by using the wireless access link is referred to as service data, and data transmitted by using the wireless backhaul link is referred to as backhaul data.

It can be learned from FIG. 1A and FIG. 1B that when the base station is connected to the network through wireless backhaul, the base station needs to uses radio resources to transmit both service data and backhaul data. Usually, the base station transmits the service data and the backhaul data in an in-band time division multiplexing and/or frequency division multiplexing manner. In this way, the base station needs to occupy some radio resources (a time resource and/or a frequency resource) dedicated for transmitting the backhaul data. Consequently, a waste of radio resources is caused and radio resource utilization is reduced.

To resolve the foregoing problem, the embodiments provide a communications method and apparatus, to implement in-band wireless backhaul of a wireless access device by using a backhaul node. For each wireless access device in a communications system, a radio resource used to transmit backhaul data by using a backhaul node is partially or completely the same as a radio resource used to transmit service data, to effectively improve radio resource utilization.

Figure 2:
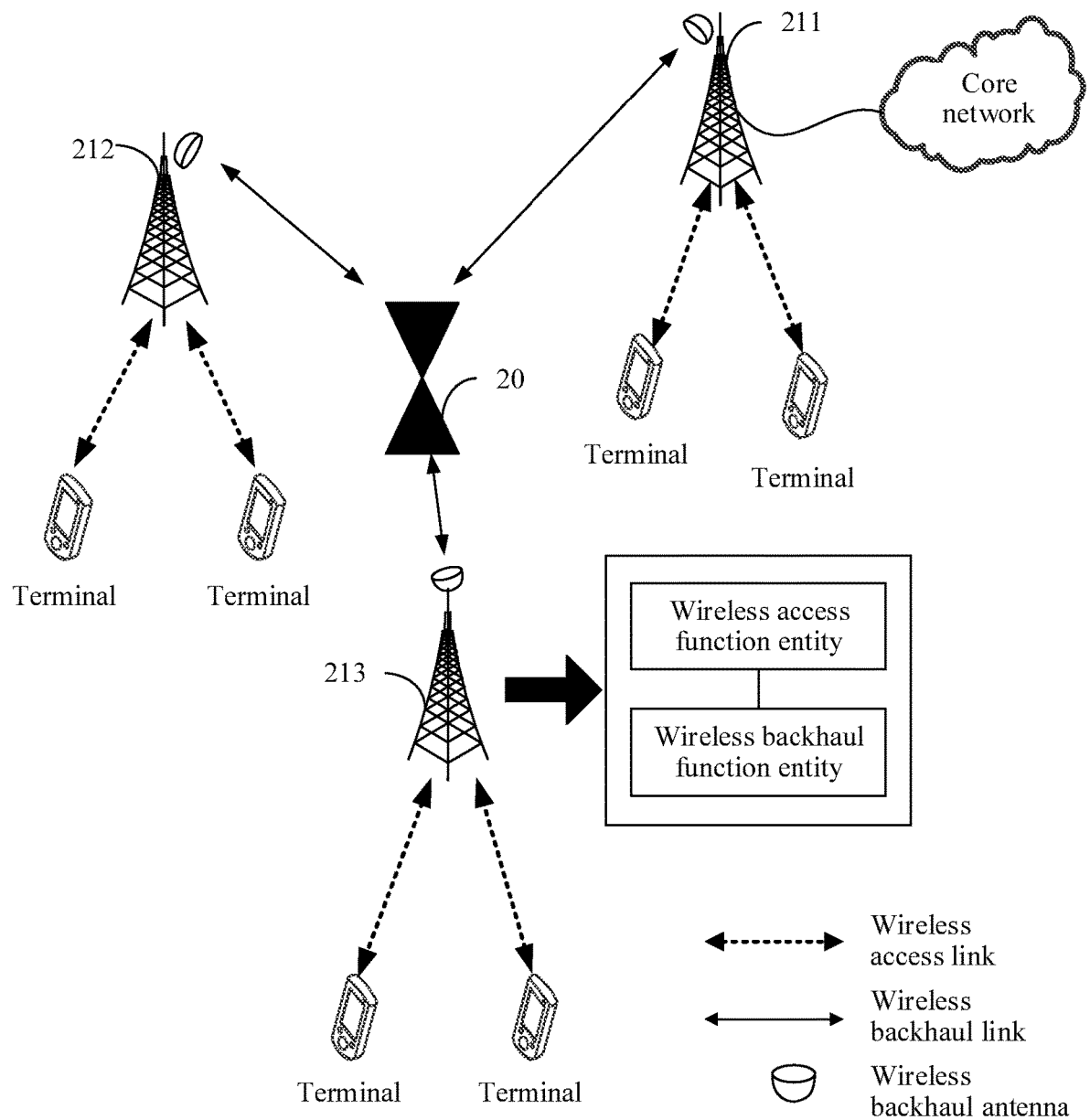
FIG. 2 is a schematic structural diagram of a communications system applicable to an embodiment.

The communications method provided in this embodiment is applied to a communications system including a backhaul node and at least one wireless access device. For example, the communications system includes a backhaul node and a plurality of wireless access devices. FIG. 2 shows an example of a communications system according to an embodiment. The communications system includes a backhaul node 20, a wireless access device 211, a wireless access device 212, and a wireless access device 213. The communications system may further include terminals, and each wireless access device in the communications system may serve terminals.

The wireless access device 211 in FIG. 2 is connected to a core network by using a wired link or a wireless link, and the backhaul node 20 provides wireless backhaul links for the wireless access device 212 and the wireless access device 213. Specifically, the backhaul node 20 is connected to the wireless access device 212 and the wireless access device 213 in a wireless manner.

The backhaul node 20 is configured to transmit backhaul data in a direction from a wireless access device to the core network, and is also configured to transmit backhaul data in a direction from the core network to a wireless access device. The backhaul node 20 usually does not provide a service data transmission service for a terminal.

In addition, the backhaul node 20 may serve as a switching node between a plurality of wireless access devices, and is configured to transmit switched data between the plurality of wireless access devices. For example, for a first wireless access device, switched data of the first wireless access device includes at least one of status information of a radio resource of the first wireless access device, status information of a user channel of the first wireless access device, and service data to be jointly sent.

For example, the wireless access device 211 may send switched data of the wireless access device 211 to the wireless access device 212 by using the backhaul node 20. The switched data of the wireless access device 211 includes at least one of status information of a radio resource of the wireless access device 211, status information of a user channel of the wireless access device 211, and service data to be jointly sent.

Certainly, the wireless access device 211 may also receive switched data from the wireless access device 212 by using the backhaul node 20. The switched data of the wireless access device 212 includes at least one of status information of a radio resource of the wireless access device 212, status information of a user channel of the wireless access device 212, and service data to be jointly sent.

Any wireless access device may send, to the backhaul node 20, backhaul data in a direction from the wireless access device to the core network, or may receive backhaul data that is in a direction from the core network to the wireless access device and that is sent by the backhaul node 20. In addition, any wireless access device may further send service data to a terminal served by the wireless access device, and receive service data sent by the terminal served by the wireless access device.

In the embodiments, any wireless access device transmits backhaul data to the backhaul node 20 by using a first radio resource, and transmits service data by using a second radio resource. The first radio resource is partially or completely the same as the second radio resource. The first radio resource and the second radio resource each include a time domain resource used for wireless transmission, or the first radio resource and the second radio resource each include a frequency domain resource used for wireless transmission, or the first radio resource and the second radio resource each include a time domain resource and a frequency domain resource used for wireless transmission.

For example, for a first wireless access device, the first wireless access device receives a first backhaul signal by using the first radio resource, and receives a first service signal by using the second radio resource. The first backhaul signal includes backhaul data sent by the backhaul node to the first wireless access device, and the first service signal includes service data sent by a terminal to the first wireless access device. Alternatively, the first wireless access device sends backhaul data to the backhaul node by using the first radio resource, and sends service data to the terminal by using the second radio resource.

The first wireless access device may be any wireless access device in FIG. 2.

The wireless access device in the embodiments of is a device serves a terminal. The wireless access device may be an access point (AP) in a wireless local area network (WLAN), a base transceiver station (BTS) in a Global System for Mobile Communications (GSM) or code-division multiple access (CDMA), a NodeB (NB) in wideband CDMA (WCDMA), an evolved NodeB (eNB or eNodeB) in Long-Term Evolution (LTE), a generation NodeB (gNodeB), a relay station or an access point, a vehicle-mounted device, a wearable device, a network device in a future 5G network, a network device in a future evolved public land mobile network (PLMN) network, or the like.

The terminal may further be referred to as a terminal device, user equipment (UE), a mobile station (MS), a mobile terminal (MT), or the like. The terminal may be a mobile phone, a tablet computer (pad), a computer with a wireless receiving/sending function, a virtual reality (VR) terminal, an augmented reality (AR) terminal, a wireless terminal in industrial control, a wireless terminal in self-driving, a wireless terminal in a remote medical surgery, a wireless terminal in smart grid, a wireless terminal in transportation safety, a wireless terminal in smart city, a wireless terminal in smart home, and the like.

Optionally, the wireless access device in the embodiments includes a wireless access function entity and a wireless backhaul function entity. The wireless access function entity is configured to communicate with a terminal and transmit service data. The wireless backhaul function entity is configured to communicate with the backhaul node and transmit backhaul data. For example, the wireless access device 211, the wireless access device 212, and the wireless access device 213 each include a wireless access function entity and a wireless backhaul function entity.

In actual application, the wireless backhaul function entity may alternatively be disposed independently, is connected to a wireless access device through a wired interface, and is wirelessly connected to the backhaul node. For example, in a microwave transmission scenario, the wireless backhaul function entity may be an independent microwave transmission device, and the microwave transmission device is connected to the wireless access device.

An example in which the wireless access device includes the wireless access function entity and the wireless backhaul function entity is described in the embodiments.

The wireless access function entity and the wireless backhaul function entity may use two different groups of antennas, and there is relatively large isolation between the two different groups of antennas. For example, the wireless backhaul function entity uses a directional antenna with a relatively narrow beam width and a relatively large beam gain, for example, a panel antenna or a parabolic antenna. The wireless access function entity uses an omnidirectional antenna.

In FIG. 2, antennas (e.g., wireless backhaul antennas) used by wireless backhaul function entities in the wireless access device 211, the wireless access device 212, and the wireless access device 213 all point to the backhaul node 20, and antennas (e.g., wireless access antennas) used by wireless access function entities point to areas served by the wireless access function entities. The backhaul node 20 and terminals are in different directions of a same wireless access device. Therefore, there is relatively large isolation between a wireless backhaul antenna and a wireless access antenna on the wireless access device.

It is easy to understand that terminals are generally located in a relatively low position, such as a road or a street. To avoid interference between backhaul data and service data during transmission, the backhaul node 20 needs to be installed at a relatively high position, such as a wire pole or a rooftop. In this way, the wireless backhaul antenna and the wireless access antenna point to different directions, so that signal interference can be avoided to some extent.

Optionally, the wireless access function entity and the wireless backhaul function entity may use a same group of antennas to send service data to a terminal (or receive service data sent by a terminal), and send backhaul data to the backhaul node (or receive backhaul data sent by the backhaul node). This implementation may be applied to a scenario in which a pointing angle of the wireless backhaul antenna is slightly different from a pointing angle of the wireless access antenna. In other words, a wireless backhaul link and a wireless access link are used to jointly transmit the backhaul data and the service data. Optionally, the wireless access device may be implemented by using an existing space division multiple access technology, for example, multi-user multiple-input multiple-output (MU-MIMO) or beamforming.

The backhaul node 20 may communicate with the wireless access device 211, the wireless access device 212, and the wireless access device 213 by using different antennas. For example, the backhaul node 20 uses directional antennas with a relatively narrow beam width and a relatively large beam gain, and beam directions point to the wireless access device 211, the wireless access device 212, and the wireless access device 213. In this way, a wireless backhaul link 1 is formed between the backhaul node 20 and the wireless access device 211, a wireless backhaul link 2 is formed between the backhaul node 20 and the wireless access device 212, a wireless backhaul link 3 is formed between the backhaul node 20 and the wireless access device 213, and the three wireless backhaul links may independently transmit backhaul data.

Optionally, the backhaul node 20 may send backhaul data to the wireless access device 212 and the wireless access device 213 by using a same group of antennas. This implementation may be applied to a scenario in which a pointing angle of a wireless backhaul antenna on the wireless access device 212 is slightly different from a pointing angle of a wireless backhaul antenna on the wireless access device 213. In other words, the backhaul data is transmitted by using both "the wireless backhaul link 2 between the backhaul node 20 and the wireless access device 212" and "the wireless backhaul link 3 between the backhaul node 20 and the wireless access device 213".

Optionally, the backhaul node 20 may be implemented by using an existing space division multiple access technology, for example, MU-MIMO or beamforming.

Optionally, the backhaul node 20, the wireless access devices, and the terminals may be deployed on land and includes indoor or outdoor devices, or handheld or vehicle-mounted devices, or may be deployed on the water, or may be deployed on airplanes, balloons, and satellites. Deployment scenarios of the backhaul node, the wireless access devices, and the terminals are not limited in the embodiments.

It should be noted that different wireless access devices in the embodiments may use a same network standard, or different network standards. For example, the wireless access device 211 and the wireless access device 212 each support a 4G network standard, and the wireless access device 213 supports a 5G network standard. In addition, network standards supported by the backhaul node 20 include a network standard of each wireless access device. When communicating with the wireless access device 211, the backhaul node 20 uses a network standard the same as that of the wireless access device 211, namely, the 4G network standard. When communicating with the wireless access device 213, the backhaul node 20 uses a network standard the same as that of the wireless access device 213, namely, the 5G network standard.

The communications system shown in FIG. 2 is merely an example. In actual application, the communications system may alternatively have another structure, and are not listed herein.

In the embodiments, the backhaul node and the wireless access network device may communicate with each other by using a licensed spectrum, or may communicate with each other by using an unlicensed spectrum, or may communicate with each other by using both a licensed spectrum and an unlicensed spectrum. This is not specifically limited in this embodiment.

The communications system t includes but is not limited to a narrowband Internet of things (NB-IoT) system, a WLAN system, an LTE system, a next-generation 5G mobile communications system, or a communications system after 5G, for example, a new radio (NR) communications system or a device-to-device (D2D) communications system.

Figure 3:
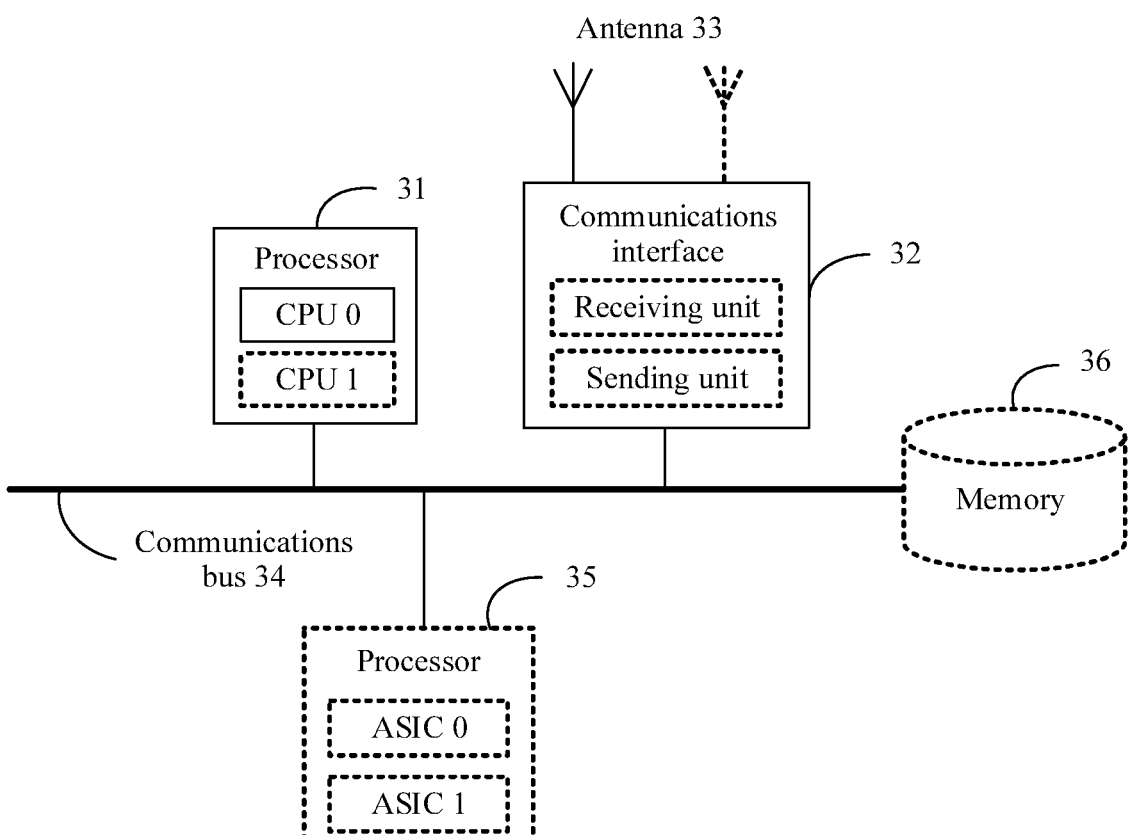
FIG. 3 is a schematic diagram of a hardware structure of a communications apparatus according to an embodiment.

Each device in FIG. 2 is a communications apparatus. FIG. 3 is a schematic composition diagram of a communications apparatus applicable to an embodiment.

As shown in FIG. 3, the communications apparatus may include a processor 31, a communications interface 32, an antenna 33, and a communications bus 34. The following describes the components of the communications apparatus with reference to FIG. 3.

The processor 31 is a control center of the communications apparatus, and may be one processor or may be a collective term of a plurality of processing elements. For example, the processor 31 is a central processing unit (CPU), or may be a microcontroller, an application-specific integrated circuit (ASIC), a modem processor, or one or more integrated circuits configured to implement the embodiments, for example, one or more digital signal processors (DSPs), or one or more field-programmable gate arrays (FPGA).

The processor 31 may include one or more CPUs, for example, a CPU 0 and a CPU 1 shown in FIG. 3.

The communications apparatus may further include another processor, for example, a processor 35 shown in FIG. 3. The processor 35 includes an ASIC 0. Each of the plurality of processors in the communications apparatus may be a single-core processor, or may be a multi-core processor. Herein, the processor may be one or more devices, circuits, and/or processing cores configured to process data (for example, a computer program instruction).

A wireless communications function of the communications apparatus may be implemented by using the communications interface 32, the antenna 33, and the like.

The communications interface 32 may provide a solution applied on the communications apparatus of wireless communication, such as a WLAN (for example, a Wi-Fi network), Bluetooth (BT), a global navigation satellite system (GNSS), frequency modulation (FM), near-field communication (NFC), and an infrared (IR) technology. The communications interface 32 may include a receiving unit for implementing a receiving function and a sending unit for implementing a sending function.

The communications interface 32 may be one or more components integrated with at least one communications processing module. The communications interface 32 receives an electromagnetic wave signal by using the antenna 33, performs frequency modulation and filtering processing on the electromagnetic wave signal, and sends a processed signal to the processor 31. The communications interface 32 may further receive a to-be-sent signal from the processor 31, perform frequency modulation and amplification on the to-be-sent signal, and convert the to-be-sent signal into an electromagnetic wave by using the antenna 33 for radiation.

In some embodiments, the communications interface 32 of the communications apparatus is coupled to the antenna 33, so that the communications apparatus can communicate with a network and another device by using a wireless communications technology. The wireless communications technology may include GSM, General Packet Radio Service (GPRS), CDMA, WCDMA, time-division CDMA (TD-CDMA), LTE, BT, GNSS, WLAN, NFC, FM, and/or an IR technology. The GNSS may include a Global Positioning System (GPS), a global navigation satellite system (GLONASS), a beidou satellite navigation system (BDS), a quasi-ceiling satellite system (QZSS), and/or a satellite-based augmentation system (SBAS).

The antenna 33 is configured to transmit and receive an electromagnetic wave signal. The antenna 33 may include a group of antennas, and each antenna may be configured to cover one or more communications frequency bands. Different antennas may be further multiplexed, to improve antenna utilization.

It can be learned from the foregoing description that if the communications apparatus is a wireless access device, the antenna 33 of the communications apparatus may include a wireless backhaul antenna pointing to a backhaul node and a wireless access antenna pointing to a terminal. The wireless backhaul antenna is configured to send backhaul data to the backhaul node (or receive backhaul data sent by the backhaul node), and the wireless access antenna is configured to send service data to the terminal (or receive service data sent by the terminal). Optionally, the antenna 33 is a group of antennas. The antenna 33 is configured to send service data to the terminal (or receive service data sent by the terminal), and send backhaul data to the backhaul node (or receive backhaul data sent by the backhaul node).

If the communications apparatus is a backhaul node, the antenna 33 of the communications apparatus may include antennas pointing to different wireless access devices, and each antenna is configured to transmit backhaul data to a wireless access device to which the antenna points. Optionally, the antenna 33 is a group of antennas, and the antenna 33 is configured to transmit backhaul data to a wireless access device to which the antenna 33 points.

The communications bus 33 may be an industry standard architecture (ISA) bus, a Peripheral Component Interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

Optionally, the communications apparatus may further include a memory 36.

The memory 36 may be configured to store a software program for executing the solutions of this disclosure. The software program includes a program instruction. The processor 31 may execute various functions of the communications apparatus by running or executing the software program stored in the memory 36 and calling data stored in the memory 36.

The memory 36 may be a read-only memory (ROM) or another type of static storage device capable of storing static information and an instruction, a random-access memory (RAM) or another type of dynamic storage device capable of storing information and an instruction, or may be an electrically erasable programmable ROM EEPROM), a magnetic disk storage medium or another magnetic storage device, or any other medium capable of carrying or storing expected program code in a form of an instruction or a data structure and capable of being accessed by a computer, but is not limited thereto. The memory 36 may exist independently, and is connected to the processor 31 by using the communications bus 34. The memory 36 may alternatively be integrated with the processor 31.

Because the memory 36 is an optional component, the memory 36 is represented by using a dashed-line box in FIG. 3.

It should be noted that a device structure shown in FIG. 3 does not constitute a limitation on the communications apparatus. In addition to the components shown in FIG. 3, the communications apparatus may include more or fewer components than those shown in the figure, or combine some components, or have different component arrangements.

The communications method provided is described with reference to the communications system shown in FIG. 2 and the communications apparatus shown in FIG. 3. Each device in the following method embodiment may have a component shown in FIG. 3, and details are not described again.

Any wireless access device is used as an example, and the communications method provided in this embodiment is as follows: The wireless access device receives a first backhaul signal by using a first radio resource, and receives a first service signal by using a second radio resource. Herein, the first backhaul signal includes backhaul data sent by a backhaul node to the wireless access device, and the first service signal includes service data sent by a terminal to the wireless access device. The first radio resource is partially or completely the same as the second radio resource.

Optionally, the wireless access device may further send backhaul data to the backhaul node by using the first radio resource, and send service data to the terminal by using the second radio resource. The first radio resource is partially or completely the same as the second radio resource.

The first radio resource and the second radio resource each include a time domain resource used for wireless transmission, or the first radio resource and the second radio resource each include a frequency domain resource used for wireless transmission, or the first radio resource and the second radio resource each include a time domain resource and a frequency domain resource used for wireless transmission.

Optionally, the first radio resource in this embodiment is some or all slot resources of an uplink frame (or an uplink slot) in a time-division duplex (TDD) system, or some or all frequency resources of an uplink spectrum in a frequency-division duplex (FDD) system.

Figure 4:
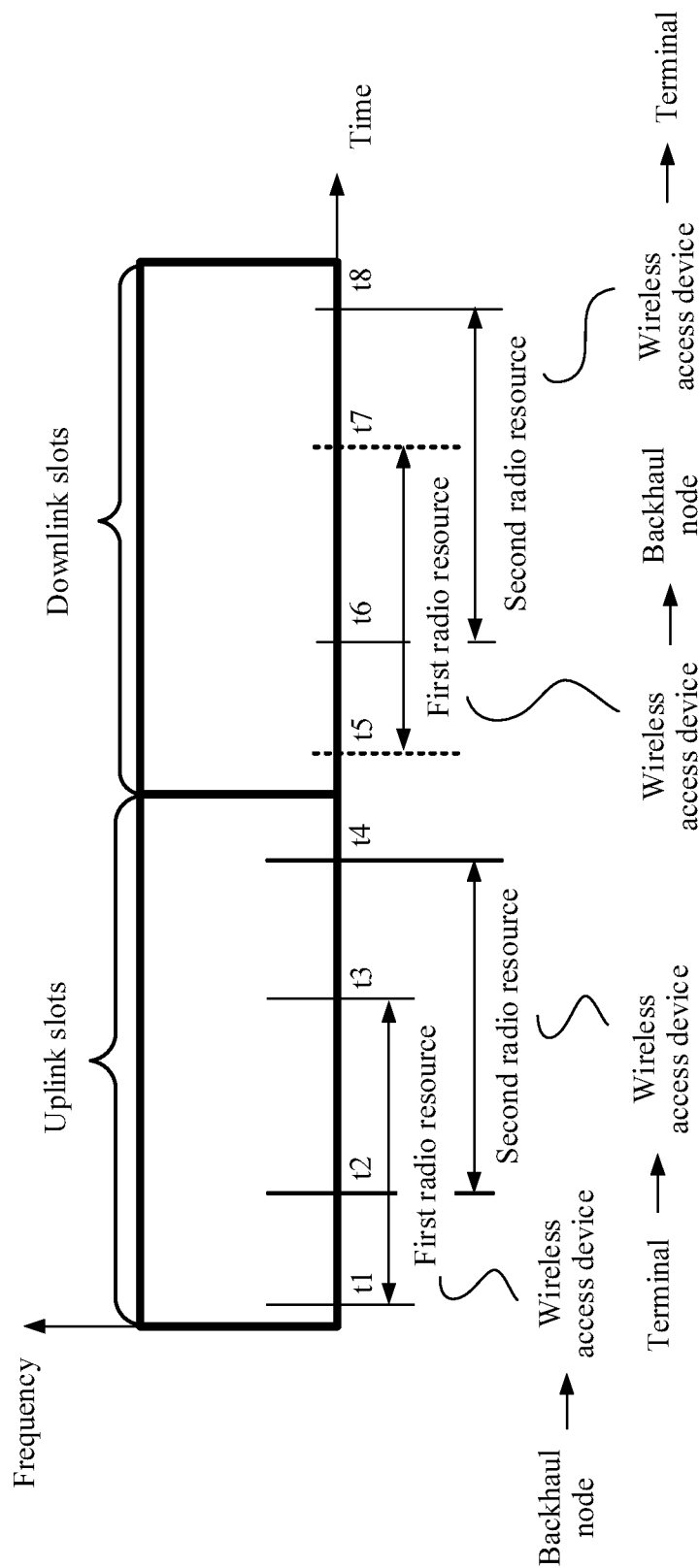
FIG. 4 is a schematic structural diagram 1 of a first radio resource and a second radio resource according to an embodiment.

In an example, as shown in FIG. 4, if a wireless access technology uses TDD, a radio frame includes uplink slots and downlink slots. The first radio resource is time domain resources t1 to t3 in the uplink slot resources, the second radio resource is time domain resources t2 to t4 in the uplink slot resources, and the first radio resource is partially the same as the second radio resource.

Figure 5:
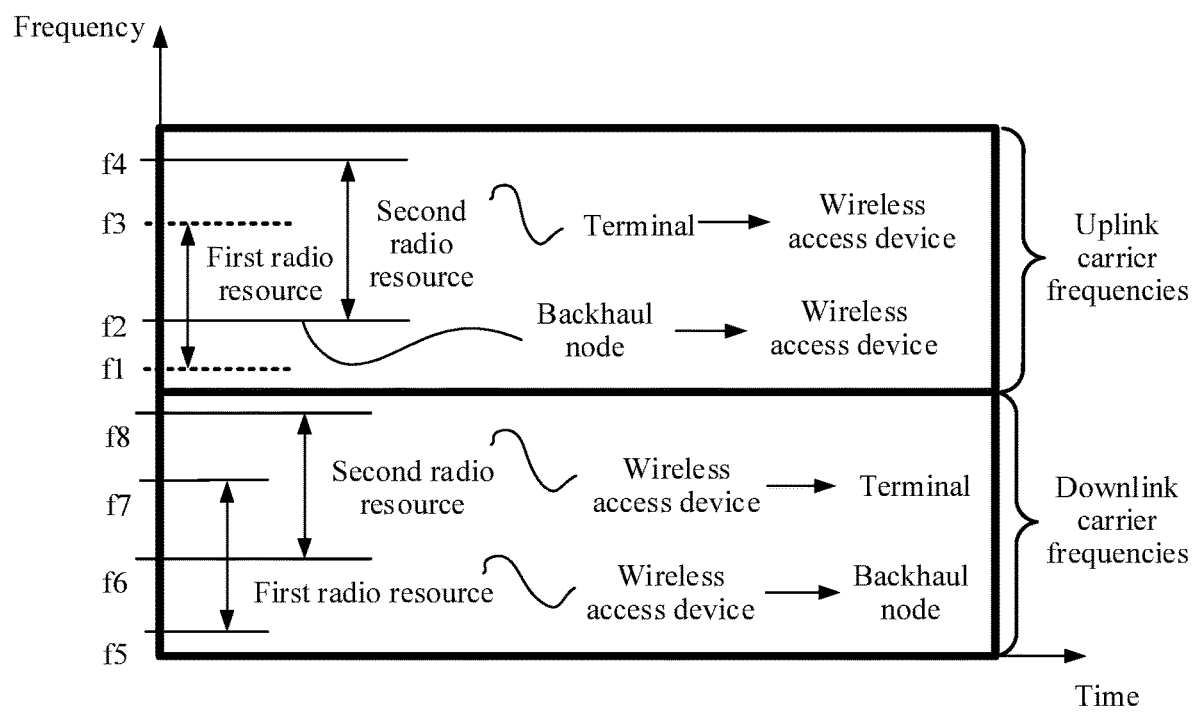
FIG. 5 is a schematic structural diagram 2 of a first radio resource and a second radio resource according to an embodiment.

In another example, as shown in FIG. 5, if a wireless access technology uses FDD, a communication frequency resource includes uplink carrier frequencies and downlink carrier frequencies. The first radio resource is frequency resources f1 to f3 in the uplink carrier frequencies, the second radio resource is frequency resources f2 to f4 in the uplink carrier frequencies, and the first radio resource is partially the same as the second radio resource.

Likewise, the first radio resource in this embodiment may alternatively be some or all slot resources of a downlink frame (or a downlink slot) in a TDD system, or some or all frequency resources of a downlink spectrum in an FDD system.

In an example, as shown in FIG. 4, if a wireless access technology uses TDD, a radio frame includes uplink slots and downlink slots. The first radio resource is time domain resources t5 to t7 in the downlink slot resources, the second radio resource is time domain resources t6 to t8 in the downlink slot resources, and the first radio resource is partially the same as the second radio resource.

In another example, as shown in FIG. 5, if a wireless access technology uses FDD, a communication frequency resource includes uplink carrier frequencies and downlink carrier frequencies. The first radio resource is frequency resources f5 to f7 in the downlink carrier frequencies, the second radio resource is frequency resources f6 to f8 in the downlink carrier frequencies, and the first radio resource is partially the same as the second radio resource.

It should be noted that t1 to t8 in FIG. 4 and f1 to f8 in FIG. 5 are all used as examples for description, and are not intended to limit radio resources.

It can be learned that the communications method provided is applicable to downlink transmission, and is applicable to uplink transmission. A signal transmission direction is not limited in this embodiment. The downlink transmission refers to sending of downlink service data or downlink signaling from a wireless access device to a terminal, or sending of backhaul data from a backhaul node to a wireless access device. The uplink transmission refers to sending of uplink service data or uplink signaling from a terminal to a wireless access device, or sending of backhaul data from a wireless access device to a backhaul node.

In an example, with reference to FIG. 2, as shown in FIG. 4, in the downlink slots, the wireless access device 211, the wireless access device 212, and the wireless access device 213 send service signals to respective terminals served by the wireless access device 211, the wireless access device 212, and the wireless access device 213, and each send a backhaul signal to the backhaul node. The backhaul signal sent by the wireless access device 211 to the backhaul node includes backhaul data in a direction from the core network to the wireless access device 211, the backhaul signal sent by the wireless access device 212 to the backhaul node includes backhaul data in a direction from the wireless access device 212 to the core network, and the backhaul signal sent by the wireless access device 213 to the backhaul node includes backhaul data in a direction from the wireless access device 213 to the core network.

In this embodiment, because there is relatively large isolation between a wireless backhaul antenna and a wireless access antenna on a wireless access device, interference between a service signal and a backhaul signal that are sent by the wireless access device (the wireless access device 211, the wireless access device 212, or the wireless access device 213) is relatively small, and the backhaul node and a terminal that is served by the wireless access device each can receive a corresponding signal.

With reference to FIG. 2, as shown in FIG. 4, in the uplink slots, the wireless access device 211, the wireless access device 212, and the wireless access device 213 receive service signals sent by respective terminals served by the wireless access device 211, the wireless access device 212, and the wireless access device 213, and each receives a backhaul signal sent by the backhaul node. The backhaul signal received by the wireless access device 211 from the backhaul node includes backhaul data in a direction from the wireless access device 212/the wireless access device 213 to the core network, the backhaul signal received by the wireless access device 212 from the backhaul node includes backhaul data in a direction from the core network to the wireless access device 212, and the backhaul signal received by the wireless access device 213 from the backhaul node includes backhaul data in a direction from the core network to the wireless access device 213.

Likewise, because there is relatively large isolation between a wireless backhaul antenna and a wireless access antenna on a wireless access device, interference between a service signal and a backhaul signal that are received by the wireless access device (the wireless access device 211, the wireless access device 212, or the wireless access device 213) is relatively small, and a wireless access function entity and a wireless backhaul function entity in the wireless access device each can receive a corresponding signal.

It should be noted that the uplink slots shown in FIG. 4 are merely used to indicate that the slots are used to transmit uplink data. The uplink slots may be consecutive uplink slots in a same frame, or may be a set of inconsecutive uplink slots in a same frame, or may be a set of uplink slots from different frames. Likewise, the downlink slots shown in FIG. 4 are merely used to indicate that the slots are used to transmit downlink data. The downlink slots may be consecutive downlink slots in a same frame, or may be a set of inconsecutive downlink slots in a same frame, or may be a set of downlink slots from different frames.

In another example, with reference to FIG. 2, as shown in FIG. 5, in the downlink carrier frequencies, the wireless access device 211, the wireless access device 212, and the wireless access device 213 send service signals to respective terminals served by the wireless access device 211, the wireless access device 212, and the wireless access device 213, and each send a backhaul signal to the backhaul node. The backhaul signal sent by the wireless access device 211 to the backhaul node includes backhaul data in a direction from the core network to the wireless access device 211, the backhaul signal sent by the wireless access device 212 to the backhaul node includes backhaul data in a direction from the wireless access device 212 to the core network, and the backhaul signal sent by the wireless access device 213 to the backhaul node includes backhaul data in a direction from the wireless access device 213 to the core network.

Because there is relatively large isolation between a wireless backhaul antenna and a wireless access antenna on a wireless access device, interference between a service signal and a backhaul signal that are sent by the wireless access device (the wireless access device 211, the wireless access device 212, or the wireless access device 213) is relatively small, and the backhaul node and a terminal that is served by the wireless access device each can receive a corresponding signal.

With reference to FIG. 2, as shown in FIG. 5, in the uplink carrier frequencies, the wireless access device 211, the wireless access device 212, and the wireless access device 213 receive service signals sent by respective terminals served by the wireless access device 211, the wireless access device 212, and the wireless access device 213, and each receives a backhaul signal sent by the backhaul node. The backhaul signal received by the wireless access device 211 from the backhaul node includes backhaul data in a direction from the wireless access device 212/the wireless access device 213 to the core network, the backhaul signal received by the wireless access device 212 from the backhaul node includes backhaul data in a direction from the core network to the wireless access device 212, and the backhaul signal received by the wireless access device 213 from the backhaul node includes backhaul data in a direction from the core network to the wireless access device 213.

Because there is relatively large isolation between a wireless backhaul antenna and a wireless access antenna on a wireless access device, interference between a service signal and a backhaul signal that are received by the wireless access device (the wireless access device 211, the wireless access device 212, or the wireless access device 213) is relatively small, and a wireless access function entity and a wireless backhaul function entity in the wireless access device each can receive a corresponding signal.

In conclusion, according to the communications method provided in this embodiment, for each wireless access device, a radio resource used to transmit the backhaul data is partially or completely the same as a radio resource used to transmit the service data. Compared with other approaches in which some radio resources need to be occupied for dedicatedly transmitting backhaul data, in the communications method provided in this embodiment, no radio resource needs to be occupied for dedicatedly transmitting backhaul data. In this embodiment, a same radio resource may be used to transmit both the service data and the backhaul data, and therefore radio resource utilization is effectively improved.

In addition, the communications method provided in this embodiment is implemented in an in-band wireless backhaul manner, and no additional spectrum license fee needs to be paid. Wireless backhaul and wireless access may be performed simultaneously, and occupy a same radio resource. Receiving and sending of wireless backhaul on a wireless access device side are completely synchronized with receiving and sending of wireless access on the wireless access device side, and therefore, full-duplex self-interference cancellation with high complexity and costs is not required.

In actual application, even if there is relatively large isolation between a wireless backhaul antenna and a wireless access antenna on a wireless access device, the wireless backhaul may still interfere with the wireless access.

To further suppress interference of the wireless backhaul to the wireless access, after receiving a service signal, the wireless access device further needs to perform interference cancellation on the service signal to obtain service data sent by the terminal. An interference cancellation function may be implemented by a wireless access function entity, or may be implemented by a wireless backhaul function entity, or may be implemented through cooperation by the wireless access function entity and the wireless backhaul function entity.

In this embodiment, an example in which the wireless access function entity cooperates with the wireless backhaul function entity to implement interference cancellation is used for description.

Specifically, the wireless access function entity obtains an estimation of a backhaul interference channel (a channel between the backhaul node and the wireless access function entity) and an estimation (a first estimation signal) of a second backhaul signal sent by the backhaul node, determines an interference estimation signal based on the estimation of the backhaul interference channel and the first estimation signal, and then determines an interference-cancelled first service signal based on the interference estimation signal and the first service signal.

For ease of understanding, the estimation of the backhaul interference channel is first described.

Generally, a service signal received by the wireless access function entity may be represented by using a formula (1):

$$\hat{y}=y+G*x+n \quad (1);$$

where $\hat{y}$ is the service signal received by the wireless access function entity, y is an uplink signal that is from a terminal and that is in the service signal received by the wireless access function entity, G is a channel matrix of the backhaul interference channel, x is a backhaul signal sent by the backhaul node, * represents a multiplication operation, G*x is an interference signal, and n is noise.

A backhaul signal received by the wireless backhaul function entity may be represented by using a formula (2):

$$Z=H*x+v \quad (2);$$

where Z is the backhaul signal received by the wireless backhaul function entity, H is a channel matrix of a channel from the backhaul node to the wireless backhaul function entity, x is a backhaul signal sent by the backhaul node, * represents a multiplication operation, H*x is a signal obtained after the backhaul signal is processed by using the channel matrix, and v is noise.

Although the uplink service signal from the terminal also causes interference to receiving of the backhaul signal by the wireless backhaul function entity, compared with a wireless access link, a wireless backhaul link uses a high-gain directional antenna, and has higher transmit power and a lower link loss, and power of the received backhaul signal is far greater than interference power of the uplink signal. Therefore, in the formula (2), interference of the uplink service signal of the terminal is considered as a part of received noise. In this case, the wireless backhaul function entity can obtain, according to the formula (2) by using an existing signal processing technology, an estimation $\hat{x}$ of the backhaul signal sent by the backhaul node.

In actual application, the wireless access device and the backhaul node are located in fixed positions and are usually disposed in relatively high positions, and a channel between the wireless access device and the backhaul node changes relatively slowly. Therefore, the wireless access device may schedule the terminal to suspend sending service data at a preset time, to determine the estimation of the backhaul interference channel.

Specifically, the wireless access device instructs the terminal to suspend sending the service data at the preset time. For example, an uplink subframe in a radio frame is idle in every K radio frames. In this way, at the preset time, only the backhaul node sends a third backhaul signal to the wireless access device. Correspondingly, the wireless backhaul function entity receives a first signal at the preset time, and the wireless access function entity receives a second signal at the preset time. The preset time is preset by a developer, or is embedded in the wireless access device. This is not specifically limited in this embodiment.

K may be a relatively large value. For example, if a length of a radio frame is 1 millisecond (ms), and a length of a subframe is 0.1 ms, K may range from 100 to 1000. Therefore, in a process of determining the estimation $\hat{G}$ of the backhaul interference channel, overheads of one subframe may be ignored.

The first signal may be represented by using the foregoing formula (2), and the second signal may be represented by using the following formula (3):

$$\hat{y}=G*x+n \quad (3)$$

It can be learned from the foregoing description that the wireless backhaul function entity may determine an estimation, namely, a second estimation signal x̂, of the third backhaul signal according to the formula (2). In this case, after obtaining the second estimation signal x̂ from the wireless backhaul function entity, the wireless access function entity may determine the estimation Ĝ of the interference channel based on the second estimation signal x̂ and the received second signal ŷ by using the foregoing formula (3).

Figure 6:
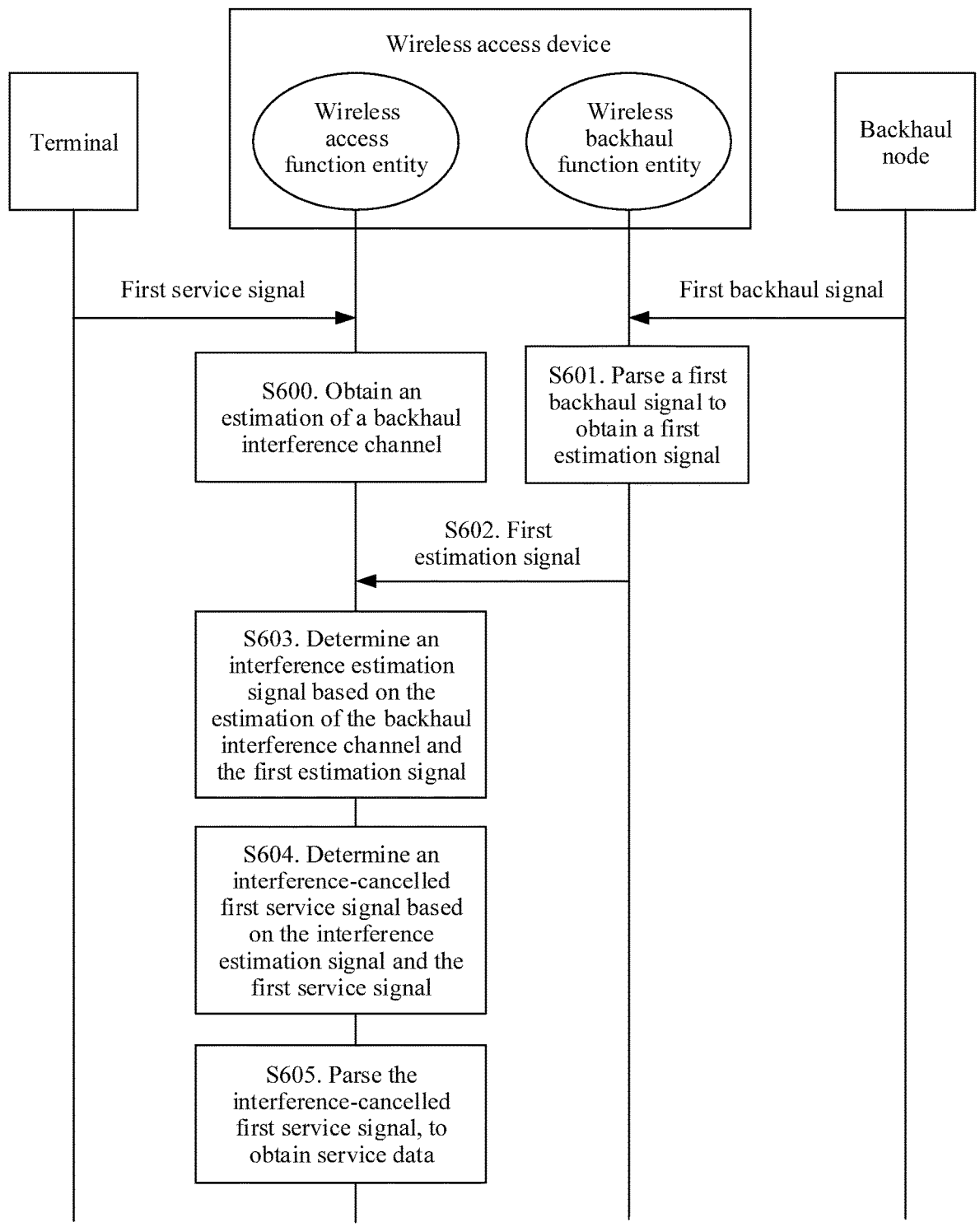
FIG. 6 is a schematic flowchart of a communications method according to an embodiment.

In this embodiment, the wireless backhaul function entity may receive the first backhaul signal by using the first radio resource, and the wireless access function entity receives the first service signal by using the second radio resource. As shown in FIG. 6, in this scenario, a method for performing, by the wireless access device, interference cancellation on the first service signal is as follows:

S600. The wireless access function entity obtains an estimation of a backhaul interference channel.

Optionally, after performing initial data receiving, the wireless access function entity determines and stores the estimation of the backhaul interference channel by using the foregoing method. In this way, after receiving the first service signal, the wireless access function entity may locally obtain the estimation of the backhaul interference channel. Alternatively, after receiving the first service signal, the wireless access function entity determines the estimation of the backhaul interference channel by using the foregoing method.

S601. The wireless backhaul function entity parses a first backhaul signal to obtain a first estimation signal, where the first estimation signal is an estimation of a second backhaul signal.

Optionally, the wireless backhaul function entity may parse the first backhaul signal according to the formula (2) to obtain the first estimation signal x̂'.

It is easy to understand that the second backhaul signal and a third backhaul signal are sent at different times in this embodiment.

S602. The wireless access function entity obtains the first estimation signal from the wireless backhaul function entity.

S603. The wireless access function entity determines an interference estimation signal based on the estimation of the backhaul interference channel and the first estimation signal.

For example, the wireless access function entity determines that the interference estimation signal is Ĝ*x̂'.

S604. The wireless access function entity determines an interference-cancelled first service signal based on the interference estimation signal and the first service signal.

For example, the wireless access function entity determines the interference-cancelled first service signal according to the formula (1), and the interference-cancelled first service signal is represented by using the following formula (4):

$$\bar{y} = \hat{y} - \hat{G}^*\hat{x}' \approx y + n \quad (4);$$

where ȳ is the interference-cancelled first service signal.

S605. The wireless access function entity parses the interference-cancelled first service signal to obtain service data.

In conclusion, according to the communications method provided in this embodiment, radio resource utilization can be effectively improved, and interference of a backhaul signal to a service signal can be effectively reduced.

An embodiment provides a communications apparatus 7. The communications apparatus 7 may be a wireless access device, or may be a component in the wireless access device, for example, a chip system in the wireless access device. Optionally, the chip system is configured to support the wireless access device in implementing the functions in the foregoing method embodiment, for example, receiving, sending, or processing data and/or information in the foregoing method. The chip system includes a chip, or may include another discrete device or circuit structure.

The communications apparatus 7 is configured to perform the steps performed by the wireless access device in the method shown in FIG. 6. The communications apparatus 7 provided in this embodiment may include modules corresponding to corresponding steps.

In this embodiment, the communications apparatus 7 may be divided into function modules based on the foregoing method example. For example, each function module may be obtained through division based on each function, or two or more functions may be integrated into one processing module. The integrated module may be implemented in a form of hardware, or may be implemented in a form of a software function module. In this embodiment, division into the modules is an example, and is merely logical function division and may be other division in an actual implementation.

Figure 7:
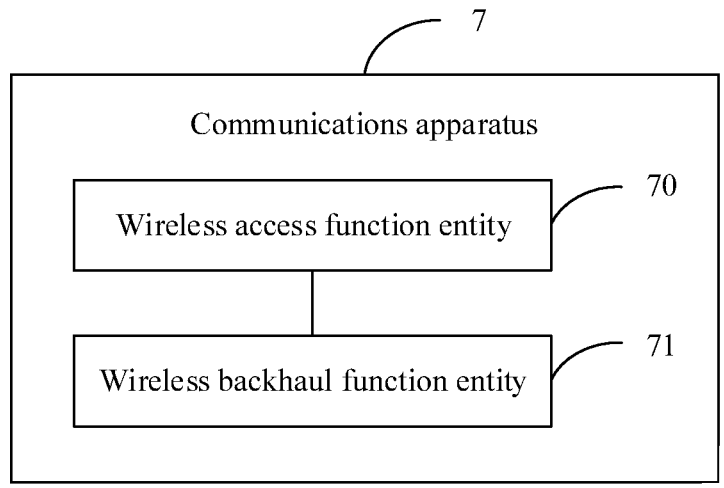
FIG. 7 is a schematic structural diagram 1 of a communications apparatus according to an embodiment.

When function modules are obtained through division based on corresponding functions, as shown in FIG. 7, the communications apparatus 7 in this embodiment may include a wireless access function entity 70 and a wireless backhaul function entity 71.

The wireless access function entity 70 is configured to support the communications apparatus 7 in processing the service data shown in FIG. 6, for example, S600, S602, S604, S605, receiving a first service signal, and/or another process of the technology described in this specification.

The wireless backhaul function entity 71 is configured to support the communications apparatus 7 in processing the backhaul data shown in FIG. 6, for example, 5601, 5602, receiving a first backhaul signal, and/or another process of the technology described in this specification.

All related content of the steps in the foregoing method embodiment may be cited in function descriptions of corresponding function modules. Details are not described herein again.

For an entity block diagram of the communications apparatus 7 provided, refer to FIG. 3. The wireless access function entity 70 may be the processor 31 and the communications interface 32 in FIG. 3, and the wireless backhaul function entity 71 may also be the processor 31 and the communications interface 32 in FIG. 3.

Another embodiment further provides a computer readable storage medium. The computer readable storage medium stores an instruction. When the instruction is run on the communications apparatus 7, the communications apparatus 7 performs the steps of the wireless access device in the communications method in the embodiment shown in FIG. 6.

Another embodiment further provides a computer program product. The computer program product includes a computer instruction, and the computer instruction is stored in a computer readable storage medium. A processor of the communications apparatus 7 may read the computer instruction from the computer readable storage medium, and the processor executes the computer instruction, so that the communications apparatus 7 performs the steps of the wireless access device in the communications method in the embodiment shown in FIG. 6.

An embodiment provides a communications apparatus 8. The communications apparatus 8 may be a backhaul node, or may be a component in the backhaul node, for example, a chip system in the backhaul node. Optionally, the chip system is configured to support the backhaul node in implementing the functions in the foregoing method embodiment, for example, receiving, sending, or processing data and/or information in the foregoing method. The chip system includes a chip, or may include another discrete device or circuit structure.

The communications apparatus 8 is configured to perform the steps performed by the backhaul node in the method shown in FIG. 6. The communications apparatus 8 provided in this embodiment may include modules corresponding to corresponding steps.

In this embodiment, the communications apparatus 8 may be divided into function modules based on the foregoing method example. For example, each function module may be obtained through division based on each function, or two or more functions may be integrated into one processing module. The integrated module may be implemented in a form of hardware, or may be implemented in a form of a software function module. In this embodiment, division into the modules is an example, and is merely logical function division and may be other division in an actual implementation.

Figure 8:
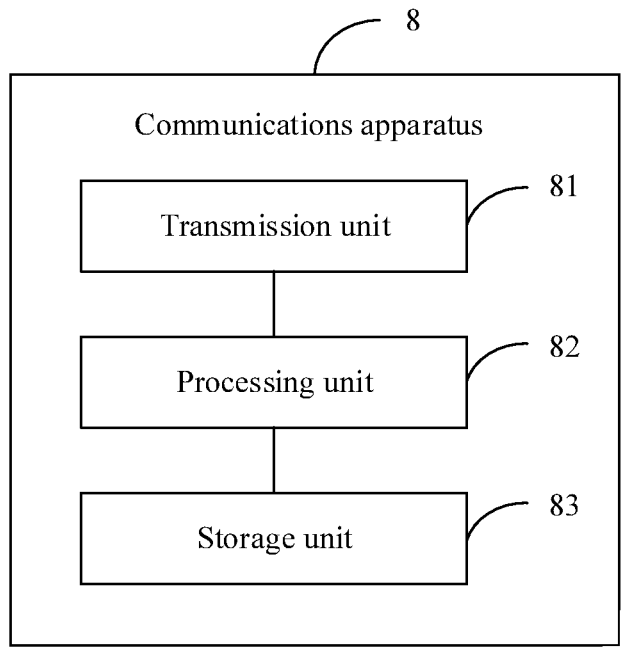
FIG. 8 is a schematic structural diagram 2 of a communications apparatus according to an embodiment.

When function modules are obtained through division based on corresponding functions, FIG. 8 is a possible schematic structural diagram of the communications apparatus 8. As shown in FIG. 8, the communications apparatus 8 includes a transmission unit 81 and a processing unit 82.

The transmission unit 81 is configured to support the communications apparatus 8 in performing an operation such as transmission shown in FIG. 6, may be further configured to receive switched data of a first wireless access device (any wireless access device described above), and send the switched data of the first wireless access device to a second wireless access device (any wireless access device other than the first wireless access device), and may be further configured to receive switched data of the second wireless access device, and send the switched data of the second wireless access device to the first wireless access device, and/or may be configured to perform another process of the technology described in this specification.

The processing unit 82 is configured to support the communications apparatus 8 in performing operations such as determining a radio resource and determining a signal forwarding direction, for example, determining a first radio resource, and/or another process of the technology described in this specification.

All related content of the steps in the foregoing method embodiment may be cited in function descriptions of corresponding function modules. Details are not described herein again.

Certainly, the communications apparatus 8 provided in this embodiment includes but is not limited to the foregoing modules. For example, the communications apparatus 8 may further include a storage unit 83.

The storage unit 83 may be configured to store program code and the like of the communications apparatus 8.

For an entity block diagram of the communications apparatus 8 provided, refer to FIG. 3. The transmission unit 81 may be the communications interface 32 and the antenna 33 in FIG. 3, the processing unit 82 may be the processor 31 in FIG. 3, and the storage unit 83 may be the memory 36 in FIG. 3.

Another embodiment further provides a computer readable storage medium. The computer readable storage medium stores an instruction. When the instruction is run on the communications apparatus 8, the communications apparatus 8 performs the steps of the backhaul node in the communications method in the embodiment shown in FIG. 6.

Another embodiment further provides a computer program product. The computer program product includes a computer instruction, and the computer instruction is stored in a computer readable storage medium. A processor of the communications apparatus 8 may read the computer instruction from the computer readable storage medium, and the processor executes the computer instruction, so that the communications apparatus 8 performs the steps of the backhaul node in the communications method in the embodiment shown in FIG. 6.

An embodiment further provides a wireless chip system. The wireless chip system includes a processor and a memory. The memory stores a computer instruction. When the computer instruction is executed by the processor, the wireless chip system is enabled to perform steps of the wireless access network device in the communications method in the embodiment shown in FIG. 6.

Optionally, the wireless chip system includes a chip, or may include another discrete device or circuit structure.

An embodiment further provides a wireless chip system. The wireless chip system includes a processor and a memory. The memory stores a computer instruction. When the computer instruction is executed by the processor, the wireless chip system is enabled to perform steps of the backhaul node in the communications method in the embodiment shown in FIG. 6.

Optionally, the wireless chip system includes a chip, or may include another discrete device or circuit structure.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any available medium accessible to a computer, or a first access network device, such as a server or a data center, integrating one or more available media. The usable medium may be a magnetic medium (for example, a floppy disk, a hard disk, or a magnetic tape), a semiconductor medium (for example, a solid-state disk (SSD)), or the like.

The foregoing descriptions about implementations allow a person skilled in the art to understand that, for the purpose of convenient and brief description, division into the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided, it should be understood that the disclosed apparatus and method may be implemented in other manners. For example, the described apparatus embodiment is merely an example. For example, the division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations, but are not intended to limit the protection scope of this disclosure. Any variation or replacement within the disclosed technical scope shall fall within the protection scope of this application. Therefore, the protection scope of this disclosure shall be subject to the protection scope of the claims.

What is claimed is:

1. A communications method implemented by a first wireless access device and comprising:
   receiving, from a backhaul node and using a first radio resource, a first backhaul signal comprising backhaul data;
   receiving, from a terminal, independent of the backhaul node, and using a second radio resource, a first service signal comprising service data, wherein the first radio resource and the second radio resource each comprise a time domain resource, a frequency domain resource, or both a time domain resource and a frequency domain resource for wireless transmission, and wherein the first radio resource is partially or completely the same as the second radio resource; and
   sending first switched data to a second wireless access device and using the backhaul node or receiving second switched data using the backhaul node,
   wherein the first switched data is of the first wireless access device and comprises status information of a radio resource of the first wireless access device, status information of a user channel of the first wireless access device, or first service data to be jointly sent, and
   wherein the second switched data is of the second wireless access device and comprises status information of a radio resource of the second wireless access device, status information of a user channel of the second wireless access device, or second service data to be jointly sent.

2. The communications method of claim 1, further comprising:
   obtaining, by a wireless access function entity of the first wireless access device, an estimation of a backhaul interference channel between the backhaul node and the wireless access function entity;
   parsing, by a wireless backhaul function entity of the first wireless access device, the first backhaul signal to obtain a first estimation signal that estimates a second backhaul signal from the backhaul node to the first wireless access device;
   determining, by the wireless access function entity, an interference estimation signal based on the estimation and the first estimation signal;
   determining, by the wireless access function entity, an interference-cancelled first service signal based on the interference estimation signal and the first service signal; and
   parsing, by the wireless access function entity, the interference-cancelled first service signal to obtain the service data.

3. The communications method of claim 2, further comprising:
   sending, by the wireless access function entity and to the terminal, a scheduling message instructing the terminal to suspend sending additional service data at a preset time, and
   receiving, by the wireless backhaul function entity, a first signal at the preset time.

4. The communications method of claim 3 further comprising receiving, by the wireless access function entity, a second signal at the preset time.

5. The communications method of claim 4, further comprising parsing, by the wireless backhaul function entity, the first signal to obtain a second estimation signal, wherein the second estimation signal estimates a third backhaul signal sent from the backhaul node to the first wireless access device at the preset time.

6. The communications method of claim 5, further comprising determining, by the wireless access function entity, the estimation based on the second signal and the second estimation signal.

7. The communications method of claim 1, further comprising further receiving the first backhaul signal through a first antenna.

8. The communications method of claim 7, wherein the first antenna is a directional antenna.

9. The communications method of claim 8, further comprising further receiving the first service signal through a second antenna.

10. The communications method of claim 9, wherein the second antenna is an omnidirectional antenna.

11. The communications method of claim 1, wherein the backhaul node does not provide a transmission service of the service data for the terminal.

12. A communications method implemented by a backhaul node and comprising:

transmitting backhaul data to a first wireless access device and using a first radio resource, wherein the first radio resource is for communicating service data between the first wireless access device and a terminal, wherein the first radio resource comprises a time domain resource or a frequency domain resource for wireless transmission, and wherein the backhaul node does not provide a transmission service of the service data for any terminal; and receiving first switched data of the first wireless access device and sending the first switched data to a second wireless access device, or receiving second switched data of the second wireless access device and sending the second switched data to the first wireless access device, wherein the first switched data comprise status information of a radio resource of the first wireless access device, status information of a user channel of the first wireless access device, or service data to be jointly sent, and wherein the second switched data comprise status information of a radio resource of the second wireless access device, status information of a user channel of the second wireless access device, or service data to be jointly sent.

13. A first wireless access device comprising:
a first antenna;
a second antenna; and
a communications interface coupled to the first antenna and the second antenna and configured to:
  receive, from a backhaul node, through the first antenna, and using a first radio resource, a first backhaul signal comprising backhaul data;
  receive, from a terminal, independent of the backhaul node, through the second antenna, and using a second radio resource, a first service signal comprising service data, wherein the first radio resource and the second radio resource each comprise a time domain resource, a frequency domain resource, or both a time domain resource and a frequency domain resource for wireless transmission, and wherein the first radio resource is partially or completely the same as the second radio resource, and
  send first switched data to a second wireless access device and using the backhaul node or receive second switched data using the backhaul node,
  wherein the first switched data is of the first wireless access device and comprises status information of a radio resource of the first wireless access device, status information of a user channel of the first wireless access device, or first service data to be jointly sent, and
  wherein the second switched data is of the second wireless access device and comprises status information of a radio resource of the second wireless access device, status information of a user channel of the second wireless access device, or second service data to be jointly sent.

14. The first wireless access device of claim 13, further comprising a processor configured to:
  obtain an estimation of a backhaul interference channel between the backhaul node and the second antenna;
  parse the first backhaul signal to obtain a first estimation signal that estimates a second backhaul signal from the backhaul node to the first wireless access device;
  determine an interference estimation signal based on the estimation and the first estimation signal;
  determine an interference-cancelled first service signal based on the interference estimation signal and the first service signal; and
  parse the interference-cancelled first service signal to obtain the service data.

15. The first wireless access device of claim 14, wherein the first antenna is a directional antenna, and wherein the second antenna is an omnidirectional antenna.

16. The first wireless access device of claim 14, wherein the processor is further configured to:
  send, to the terminal and through the second antenna, a scheduling message instructing the terminal to suspend sending additional service data at a preset time; and
  receive, a first signal at the preset time through the first antenna.

17. The first wireless access device of claim 16, wherein the first antenna is a directional antenna, and wherein the second antenna is an omnidirectional antenna.

18. The first wireless access device of claim 16, wherein the processor is further configured to receive a second signal at the preset time through the second antenna.

19. The first wireless access device of claim 18, wherein the processor is further configured to parse the first signal to obtain a second estimation signal, wherein the second estimation signal estimates a third backhaul signal sent from the backhaul node to the first wireless access device at the preset time.

20. The first wireless access device of claim 19, wherein the processor is further configured to determine the estimation based on the second signal and the second estimation signal.

21. The first wireless access device of claim 20, wherein the first antenna is a directional antenna, and wherein the second antenna is an omnidirectional antenna.

22. The first wireless access device of claim 13, wherein the first antenna is a directional antenna, and wherein the second antenna is an omnidirectional antenna.

23. The first wireless access device of claim 13, wherein the backhaul node does not provide a transmission service of the service data for the terminal.

24. A backhaul node comprising:
a memory configured to store instructions; and
a processor coupled to the memory and configured to execute the instructions to cause the backhaul node to:
  transmit backhaul data to a first wireless access device and using a first radio resource, wherein the first radio resource is for communicating service data between the first wireless access device and a terminal, wherein the first radio resource comprises a time domain resource or a frequency domain resource for wireless transmission, and wherein the backhaul node does not provide a transmission service of the service data for any terminal; and
  receive first switched data of the first wireless access device and send the first switched data to a second wireless access device, or receive second switched data of the second wireless access device and send the second switched data to the first wireless access device,
  wherein the first switched data comprise status information of a radio resource of the first wireless access device, status information of a user channel of the first wireless access device, or service data to be jointly sent, and
  wherein the second switched data comprise status information of a radio resource of the second wireless access device, status information of a user channel of the second wireless access device, or service data to be jointly sent.

* * * * *